United States Patent
Ho et al.

(10) Patent No.: US 8,184,983 B1
(45) Date of Patent: May 22, 2012

(54) WIRELESS DIRECTIONAL IDENTIFICATION AND SUBSEQUENT COMMUNICATION BETWEEN WEARABLE ELECTRONIC DEVICES

(75) Inventors: Harvey Ho, Mountain View, CA (US); Babak Amirparviz, Mountain View, CA (US); Luis Ricardo Prada Gomez, Hayward, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/156,895

(22) Filed: Jun. 9, 2011

Related U.S. Application Data (60) Provisional application No. 61/413,105, filed on Nov. 12, 2010.

(51) Int. Cl.
*H04B 10/00* (2006.01)
(52) U.S. Cl. ........ 398/130; 398/128; 398/135; 398/129; 398/131; 398/122; 398/156; 398/118; 398/115; 455/41.2; 455/41.3; 455/456.1; 455/456.2; 370/310; 370/252; 370/338; 345/7; 345/8; 345/156; 345/158
(58) Field of Classification Search ............. 398/130, 398/131, 129, 135, 136, 137, 138, 139, 122, 398/115, 118, 121, 41, 141, 156, 158, 164, 398/42, 72, 66, 67, 68, 162, 116, 166, 127; 455/41.2, 41.3, 456.1, 456.2, 456.3, 456.6; 370/310, 311, 338, 252, 331, 336, 328, 350, 370/329; 345/7, 8, 9, 156, 158, 157, 169, 345/173
See application file for complete search history.

(56) References Cited

U.S. PATENT DOCUMENTS 5,926,144 A    7/1999  Bolanos et al.
(Continued)

FOREIGN PATENT DOCUMENTS

JP    2002186022 A    6/2002
(Continued)

OTHER PUBLICATIONS

Mittra et al., "Modeling of Interaction Between Body-Mounted Antennas" First European Conference on Antennas and Propagation, Nov. 6-10, 2006. Retrieved from the internet at http://ieeexplore.ieee.org/xpl/freeabs_all.jsp?arnumber=4584858.

(Continued)

*Primary Examiner* — Hanh Phan
(74) *Attorney, Agent, or Firm* — McDonnell Boehnen Hulbert & Berghoff LLP (57) ABSTRACT

Disclosed are methods, devices, and systems for exchanging information between a first wearable electronic device and one of a second wearable electronic device and an account at a remote computing device associated with a user of the second wearable electronic device. The first wearable electronic device intermittently emits directed electromagnetic radiation comprising a beacon signal, and receives, via a receiver coupled to the first wearable electronic device, a signal from the second wearable electronic device identifying one of the second wearable electronic device and the account at the remote computing device. An input may then be detected at the first wearable electronic device, and in response to receiving the signal and detecting the input, the first wearable device may transmit additional data to one of the second wearable electronic device and the remote computing device associated with the second user.

20 Claims, 7 Drawing Sheets

U.S. PATENT DOCUMENTS

| | | | |
|---|---|---|---|
| 6,597,320 | B2 | 7/2003 | Maeda et al. |
| 6,711,414 | B1 | 3/2004 | Lightman |
| 6,729,726 | B2 | 5/2004 | Miller et al. |
| 6,888,502 | B2 | 5/2005 | Beigel et al. |
| 7,278,734 | B2 | 10/2007 | Jannard et al. |
| 7,301,529 | B2 | 11/2007 | Marvit et al. |
| 7,313,246 | B2 | 12/2007 | Miller et al. |
| 7,342,503 | B1 | 3/2008 | Light et al. |
| 7,353,996 | B2 | 4/2008 | Goodman et al. |
| 7,362,738 | B2 | 4/2008 | Taube et al. |
| 7,394,346 | B2 | 7/2008 | Bodin |
| 7,500,747 | B2 | 3/2009 | Howell et al. |
| 7,522,058 | B1 | 4/2009 | Light et al. |
| 7,538,745 | B2 | 5/2009 | Borovoy et al. |
| 7,667,657 | B2 | 2/2010 | Koshiji |
| 7,715,873 | B1 | 5/2010 | Biere et al. |
| 7,729,325 | B2 | 6/2010 | Gopalakrishnan et al. |
| 7,769,412 | B1 | 8/2010 | Gailloux |
| 7,810,750 | B2 | 10/2010 | Abreu |
| 7,822,804 | B2 | 10/2010 | Lee et al. |
| 7,830,319 | B2 | 11/2010 | Cohen et al. |
| 7,877,121 | B2 | 1/2011 | Seshadri et al. |
| 7,991,294 | B2 * | 8/2011 | Dreischer et al. ............ 398/137 |
| 2002/0042292 | A1 | 4/2002 | Hama |
| 2002/0131121 | A1 * | 9/2002 | Jeganathan et al. ........... 359/152 |
| 2004/0101178 | A1 | 5/2004 | Fedorovskaya et al. |
| 2004/0157648 | A1 | 8/2004 | Lightman |
| 2005/0021679 | A1 | 1/2005 | Lightman et al. |
| 2005/0068239 | A1 | 3/2005 | Fischer et al. |
| 2006/0041758 | A1 | 2/2006 | Dunn et al. |
| 2006/0115130 | A1 | 6/2006 | Kozlay |
| 2006/0123463 | A1 | 6/2006 | Yeap et al. |
| 2007/0037520 | A1 | 2/2007 | Warren |
| 2007/0273679 | A1 | 11/2007 | Barton |
| 2009/0111526 | A1 | 4/2009 | Masri |
| 2009/0239591 | A1 | 9/2009 | Alameh et al. |
| 2010/0066821 | A1 | 3/2010 | Rosener et al. |
| 2010/0103075 | A1 | 4/2010 | Kalaboukis et al. |
| 2010/0138481 | A1 | 6/2010 | Behrens |
| 2010/0144268 | A1 | 6/2010 | Haberli |
| 2010/0149073 | A1 | 6/2010 | Chaum |

FOREIGN PATENT DOCUMENTS

| | | |
|---|---|---|
| WO | 2008087250 | 7/2008 |

OTHER PUBLICATIONS

Choi et al., "Intelligent Wearable Assistance System for Communicating with Interactive Electronic Media", ICAT 2003, Dec. 3-5, 2003. Retrieved on Feb. 22, 2011 from: http://citeseerx.ist.psu.edu/viewdoc/download?doi=10.1.1.109.3114&rep=rep1&type=pdf.

\* cited by examiner

WIRELESS DIRECTIONAL IDENTIFICATION AND SUBSEQUENT COMMUNICATION BETWEEN WEARABLE ELECTRONIC DEVICES

REFERENCE TO RELATED APPLICATIONS

The present application claims priority to U.S. Provisional Patent Application Ser. No. 61/413,105, filed in the United States Patent and Trademark Office on Nov. 12, 2010, the entire contents of which is incorporated herein by reference.

BACKGROUND

Unless otherwise indicated herein, the materials described in this section are not prior art to the claims in this application and are not admitted to be prior art by inclusion in this section.

Various technologies can be utilized to electronically exchange information between users. For example, mobile telephones and personal digital assistants (PDAs) may be used to exchange information via a short-range omni-directional wireless protocol, such as Bluetooth® (BT) or IEEE Wi-fi (802.11a/b/g/n). Information exchanged between such devices may include, for example, audio signals (e.g., speech), contact information, photos, or video.

SUMMARY

Due to the omni-directional nature of wireless communications protocols such as Bluetooth and IEEE Wi-fi, it can be difficult to target a particular desired user and/or device with which to communicate. For example, in the case of Bluetooth, a user operating a mobile telephone having Bluetooth capabilities must initiate a Bluetooth discovery procedure, which will broadcast an omni-directional discovery request and then aggregate responses from all devices within a communication range of the mobile telephone that are set to respond to such requests. The mobile telephone user must then parse the list of responding devices, which sometimes may contain confusing or random identifiers unassociated with a user of the responding device, and select the particular responding device with which the mobile telephone user wishes to communicate.

Recent developments in wearable communication devices provide an opportunity to improve upon this process. For example, recent advances in wearable systems for displaying information utilizing a "heads-up" display provide a vehicle for improving upon the process of discovering and selecting devices or persons to communicate with. A heads-up display is a device that may typically be positioned near the user's eyes to allow the user to view displayed images or information with little or no head movement. To generate the images on the display, a computer processing system may be used. Such heads-up displays have a variety of applications, such as aviation information systems, vehicle navigation systems, and video games, among others.

One type of heads-up display is a head-mounted display. A head-mounted display can be incorporated into a pair of goggles, glasses, a headband, a helmet, or other such device that the user can wear. The display is typically calibrated and aligned in the user's field of view.

In addition to a heads-up display, other types of wearable devices could also be used. Preferably, the wearable device is configured to track a field-of-view of a wearer, similar to the way that a heads-up-display tracks a direction in which a user is looking. For example, an ear piece attached to a wearer's ear may similarly track a user's field of view. Other types of wearable devices are possible as well, such as an electronic device integrated or fastened to a belt, shoes, wrists, or other body parts which generally track a direction in which a user may face. These devices may or may not be integrated with a display device. In some embodiments, they may simply provide a mechanism for directed electromagnetic communication with other devices, and may interface wiredly or wirelessly with other computing devices, including heads-up displays, to support functions such as input, display, output, etc.

Disclosed herein are methods and devices for establishing initial contact between first and second user-wearable devices via a directed electromagnetic radiation, and for subsequently exchanging information between the first and second user-wearable devices.

For example, in an embodiment, a first wearable electronic device associated with a first user may intermittently (or periodically) emit, via a transmitter coupled to the first wearable electronic device, directed electromagnetic radiation comprising a beacon signal. A second wearable electronic device associated with a second user may detect the beacon, and may respond by transmitting an identifying signal identifying one of the second wearable electronic device and a second user associated with the second wearable electronic device. Responsive to receiving the identifying signal (via a corresponding receiver) and detecting a predefined user input, the first wearable electronic device may then transmit data to either the second wearable electronic device or a remote electronic device associated with the second user or with the second wearable electronic device.

In an embodiment, the directed electromagnetic radiation may be a modulated infrared (IR) beam emitted from an IR device, such as an IR light emitting diode (LED) or IR laser device. Of course, the directed electromagnetic radiation may include any other type of directed electromagnetic radiation in the electromagnetic spectrum, including, for example, radio-frequency (RF) waves emitted from a directed antenna. As examples of a directed antenna, a yagi antenna, a log-periodic antenna, a corner reflector antenna, a patch antenna, or a parabolic antenna could be used, among others. Furthermore, and in addition to directed electromagnetic radiation, other types of directed wireless transmissions could be used. For example, directed acoustic energy in the human audible or inaudible range could be used. A beam forming acoustic transducer array could be used to aim the acoustic beam in a particular direction. Other types of directed wireless transmissions could be used as well.

In at least one embodiment, directed electromagnetic radiation may include a beam having a width equal to or narrower than a human's field of view (approximately 180°). For example, the beam width, measured in a horizontal plane, may be less than 120°, and may further be less than 90° or less than 30°. The wearable devices may be head-mounted devices that are capable of tracking changes in a user's field of view as the user's head is turned, or may be body-mounted devices capable of tracking a direction in which a user is facing. Other types of wearable device could also be used.

In an embodiment, a signal strength indicator on an outer surface of the first wearable electronic device may provide an indication of a strength of a currently-received signal (e.g., an IR beam in one embodiment). The signal strength indicator could be used by the second user, while transmitting a signal to the first user, to aim the second wearable electronic device to obtain a higher quality communication link between the first and second wearable electronic devices.

In some embodiments, the predefined user input detected at the first wearable electronic device may be a forward swipe across a touch-sensitive surface, disposed on a side of the first device, in a direction from the first user towards the second user to resemble a "flick" of data from the first user to the second user. The touch-sensitive surface may be a capacitive sensing or resistance sensing pad, among other possibilities. In another embodiment, the predefined user input may be a voice command detected by a microphone coupled to the first wearable electronic device, or may be a head or body movement detected by a motion sensor coupled to the first wearable electronic device.

The transmitted data may be contact information, photo data, video data, and/or audio data associated with the first user. The data may be transmitted directly to the second wearable electronic device, or to a different remote electronic device that is associated with the second user. For example, in the case of an IR LED acting as the transmitter, data may be modulated onto the IR LED light emissions and transmitted to the second wearable electronic device. More specifically, a pulse-width modulation (PWM), among other possibilities, may be used to transmit data via the IR LED. In one embodiment, the data may be transmitted to the second wearable electronic device via a second different transmitter and/or protocol than that used to make initial contact. For example, once initial contact is made via directed electromagnetic transmission, data may be subsequently exchanged via the second different transmitter, implementing a Bluetooth, IEEE 802.11 (Wi-Fi), WiMAX, Cellular, Zigbee, or other omni-directional or directed transmission protocol. It should be understood that for situations in which the systems and methods discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

Additionally or alternatively, the data may be transferred to a remote electronic device associated with the second user different from the second wearable electronic device. The remote electronic device may be, for example, a mobile phone associated with the second user, a remote computing device including an account or data store associated with the second user, or some other remote electronic device. The second different transmitter and/or protocol may be used to transmit data to the remote computing device. Access to the remote computing device may be via one or more base stations, routers, switches, LANs, WLANs, WANs, base stations, access points, or other network infrastructures. An additional identifier may be transmitted along with the data in order to identify the second user and/or an account at the remote computing device that is associated with the second user. The additional identifier may be associated with or derived from the signal received by the first wearable electronic device. The remote server may use the additional identifier to store the data in a particular data store associated with the second user, to forward the data to the second user or some other data store or service associated with the second user, and/or to otherwise notify the second user of the reception of the data from the first wearable electronic device.

The signal identifying the second user or the second wearable electronic device may be, for example, a user name or password associated with the second user or the second wearable electronic device, a hardware device ID associated with the second wearable electronic device, an e-mail address associated with the second user or the second wearable electronic device, or a user account identifier associated with the second user or the second wearable electronic device, among other possibilities. The additional identifier may be the same as the signal, or may be some other identifier derived from the signal or based on the signal. Accordingly, along with the data transmitted to the remote electronic device, the first wearable electronic device may also transmit an instruction to the remote electronic device to store the data in an account at the remote electronic device associated with the second user. Additionally or alternatively, the instruction may instruct the remote electronic device to forward the data to a particular destination associated with the second user, such as an e-mail address associated with In some cases, the signal received by the first electronic device may indicate a desired method of subsequent communications (e.g., directly back to the second electronic device via the same transmission protocol or via some alternative transmission protocol) and/or may identify the remote electronic device (and include an associated additional identifier) as the destination that subsequent data should be transmitted to.

In an embodiment, the beacon signal emitted by the first wearable electronic device may describe additional communications capabilities of the first wearable electronic device. In one example, assuming the first wearable electronic device emits a beacon signal via an IR emitter indicating an additional ability to communicate via Bluetooth, the second wearable electronic device may then indicate in a responsive signal transmission that further communications should occur via Bluetooth, and may include a Bluetooth identifier that the first wearable electronic device may use to pair with either the second wearable electronic device or another electronic device associated with the second user (such as a mobile phone or PDA) that may act as the remote electronic device or as an extension of the second wearable electronic device. Subsequently, the first wearable electronic device may automatically (or responsive to receiving user-authorization to do so) pair with the second wearable electronic device (or remote electronic device) via Bluetooth and transmit data to the second wearable electronic device (or remote electronic device) via the established Bluetooth link.

In some embodiments, the first wearable electronic device may receive, via the receiver, a second beacon signal from a third wearable electronic device associated with a third user. In response, the first wearable electronic device may transmit to the third wearable electronic device, via the transmitter, a second signal identifying one of the first wearable electronic device and the first user. Further interactions between the first and third wearable electronic devices may occur in a same or similar manner to that set forth above.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to wireless directional identification and communication between wearable electronic devices. First, examples of wearable electronic device structures will be discussed, followed subsequently by discussions of their operation and interaction, of an example hardware system for supporting their operation and interaction, and of an example computer program product for supporting their operation and interaction.

1. Wearable Electronic Device Structures and Systems

Figure 1:
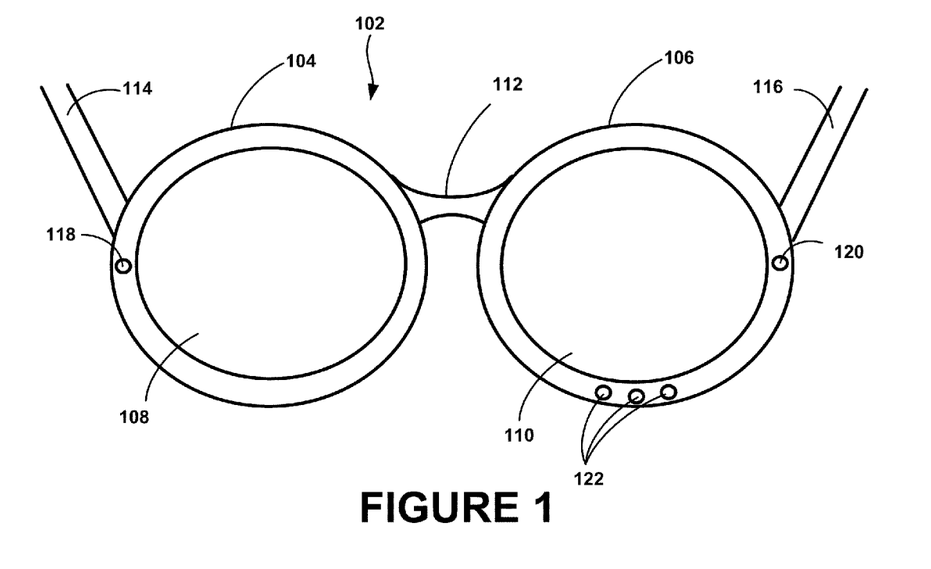
FIG. 1 shows an example embodiment of a wearable electronic device structure.

FIG. 1 shows an example embodiment of a wearable electronic device structure. While FIG. 1 illustrate glasses 102 as an example of a wearable electronic device structure, other types of wearable electronic device structures could additionally or alternatively be used. As illustrated in FIG. 1, glasses 102 have frame elements including lens-frames 104, 106, respective lens elements 108 and 110, center frame support 112, and two rear-ward extending stems 114 and 116. The center frame support 112 and the two stems 114 and 116 are configured to secure the glasses 102 to a user's face via a user's nose and ears, respectively. Each of the lens-frames 104, 106, center support 112, and stems 114, 116 may be formed of a solid structure such as wood, plastic, or metal, or may be formed as a hollow structure of similar material so as to allow wiring and component interconnects to be internally routed through the glasses 102. Other materials could be used as well.

Disposed on the lens-frame 104 is a first electromagnetic radiation transmission device 118, and disposed on the opposite lens-frame 106 is a first electromagnetic radiation reception device 120. Although the devices 118 and 120 are illustrated as disposed on opposing sides of the glasses 102, they may alternatively be placed on a same side of the glasses 102. Furthermore, while they are shown disposed on lens-frames 104 and 106, one or both may alternatively be disposed on other frame elements of glasses 102. Additionally, while only one transmission device 118 and one reception device 120 are respectively illustrated in FIG. 1, other embodiments may include more than one transmission device 118 and/or more than one reception device 120. In the event multiple transmission devices are disposed on glasses 102, such multiple transmission devices may be aimed in different directions to increase the communication range of the glasses 102 or may be used to increase a signal strength of a transmitted signal. Multiple reception devices 120 may be disposed to improve sensitivity in detecting a received signal, or may be disposed across multiple frame elements to increase a number of directions from which signals could be detected by glasses 102. Also included on the lens-frame 106 may be one or more externally-viewable signal-strength indicators 122 that indicate a strength of the signal being received at the reception device 120. For example, the signal-strength indicator 122 may be a set of LEDs configured such that, as the signal-strength improves, a greater number of LEDs are illuminated (for example, from one LED to three LEDs). Other methods of conveying signal strength could be used as well, such as a brightness of one or more LEDs, a color of one or more LEDs, or characteristics of other types of visual indicators.

Figure 2:
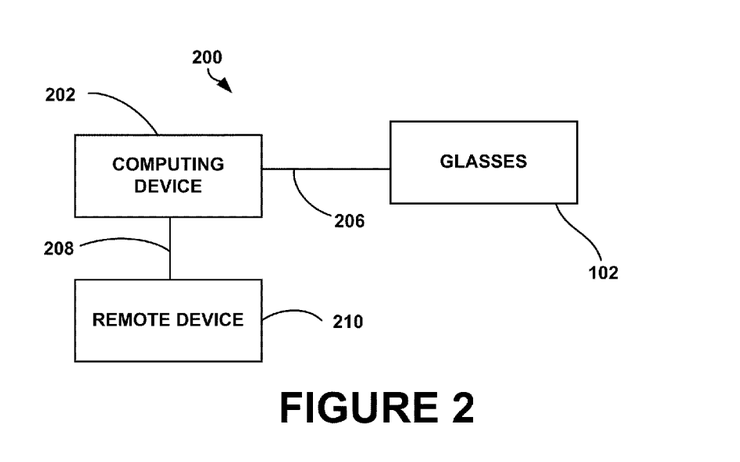
FIG. 2 shows an example embodiment of a wearable electronic device system.

FIG. 2 shows an example embodiment of a wearable electronic device system. As shown in FIG. 2, a wearable electronic device system 200 may include glasses 102 coupled to a computing device 202 via a connection 206. The structure of computing device 202 will be described in more detail with respect to FIG. 8. In one embodiment, the computing device 202 may be incorporated into the glasses 102 themselves (e.g., coupled to one or more frame elements or disposed inside one or more frame elements). In another embodiment, the computing device 202 may be a head-mounted computing device incorporated into, for example, a hat or helmet, or may a body-mounted computing device incorporated into, for example, a waist-mounted mobile phone or personal digital assistant. The connection 206 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or ZigBee, among other possibilities. The connection 206 may support the transmission of data and/or commands to the glasses 102 (e.g., for transmission by transmission device 118 or for display on the inside surface of lenses 108 or 110) and/or the transmission of data and/or commands to the computing device 202 (e.g., received by reception device 120).

Figure 3:
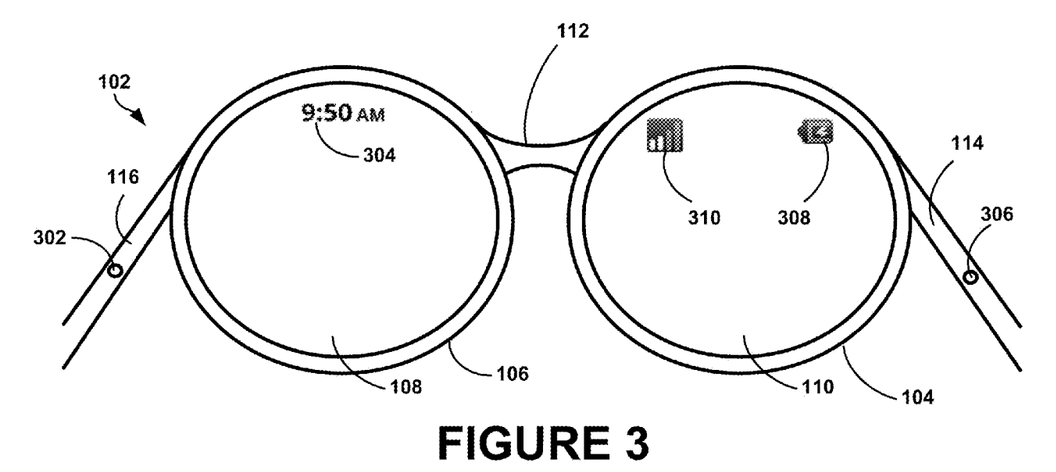
FIG. 3 shows an example embodiment of a wearable electronic device structure including a display.

FIG. 3 shows an example embodiment of glasses 102 operating as a wearable electronic device structure including a display. As shown in FIG. 3, the lenses 108 and/or 110 may act as display elements. Glasses 102 may include a miniature projector 302 coupled to an inside-surface of stem 114 and configured to project a display onto an inside-surface of lens 108. For example, the projected display may include a current time 304. Additionally or alternatively, a second projector 306 may be coupled to an inside-surface of stem 116 and configured to project a display onto an inside-surface of lens 110. For example, the projected display may include a current battery-level 308 associated with the system 200. Additionally, a signal strength indicator 310 may provide a user with an indication of a signal strength being received by the reception device 120. While indicator 310 is illustrated as providing a plurality of signal strength bars, other types of signal strength displays could be used, such as a numeric text, a line-graph, etc. Of course, other types of display elements could be used in addition or instead of miniature projectors 302, 306. For example, the lenses 108, 110 themselves may include a transparent or semi-transparent matrix display such as an electroluminescent (EL) display or liquid crystal display (LCD). A corresponding display driver may be disposed within the lens frames 104, 106 for driving the matrix display. In another example, a laser or LED source and scanning system could be used to draw a raster display directly onto the retina of one or more of the user's eyes. Other possibilities exist as well.

Returning to FIG. 2, the wearable electronic device system 200 may also communicate with a remote device 210 via a connection 208. Connection 208 may be a wired and/or wireless link having one or more of the characteristics described above with respect to the connection 206. The remote device 210 may be a device associated with a second wearable electronic device system (or a user thereof, not shown) with which the wearable electronic device system 200 is in communication with, such as a mobile phone, a personal data assistant (PDA), or some other device. For example, the remote device 210 may be a mobile phone having Bluetooth capabilities. Once initial contact is made between the first wearable electronic device system 200 and the second wearable electronic device system, further communications may be effected between the first system and the remote device 210 via a Bluetooth link (e.g., the connection 208).

In at least one embodiment, the remote device 210 may be a server associated with the second wearable electronic device (or the user thereof), or a server having an account associated with the second wearable electronic device (or the user thereof). The connection 208 may include one or more base stations, routers, switches, LANs, WLANs, WANs, base stations, access points, or other network infrastructures. For example, remote device 210 may be accessible via the Internet, and may be a computing cluster associated with a particular web service (e.g., social-networking, photo sharing, address book, etc.). In one embodiment, remote device 210 may be a proxy or forwarding server that serves to forward data received from the electronic device system 200 on behalf of a second user associated with the second wearable electronic device.

Figure 4:
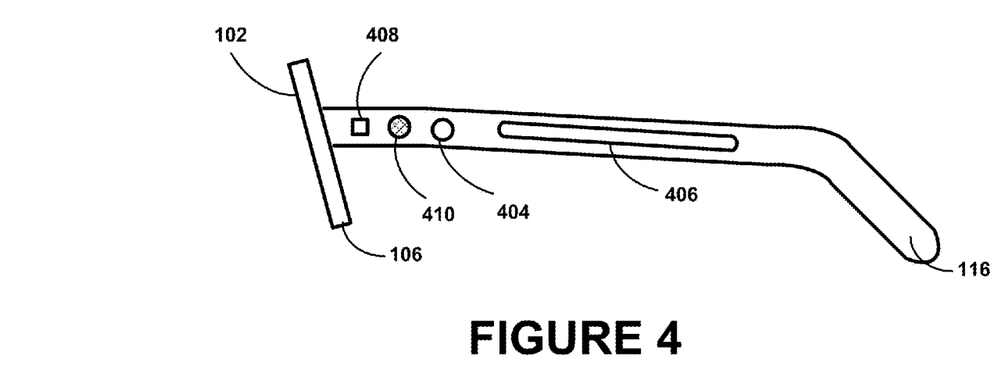
FIG. 4 shows an example embodiment of an input interface for the wearable electronic device structure of FIG. 1.

FIG. 4 shows an example embodiment of an input interface for glasses 102 that allows a user to interact with the glasses 102 and the computing device 202. The input interface may include one or more of buttons or switches 404, a touch-sensitive surface 406, a movement sensor 408, and a microphone 410, among other possibilities.

For example, one or more buttons or switches 404 may be provided on an outer surface of stem 114, and may be manipulated by a user to interface with the glasses 102 and/or computing device 202. The touch-sensitive surface 406 may be similarly disposed on an outer surface of stem 114, and may be manipulated by a user to interface with the glasses 102 and/or computing device 202. The touch-sensitive surface 406 may be a capacitive sensing or resistance sensing pad, among other possibilities.

The movement sensor (such as an accelerometer, magnetometer, and/or gyroscope) 408 may be provided on or in a frame element of the glasses 102, and may act as an input device based on a user's tracked movements. An accelerometer is a device that measures acceleration. Single- and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used.

The movement sensor 408 may be used, for example, to determine when, how much, and perhaps how quickly, a user wearing the glasses 102 turns or moves his or her head or body to the right, left, up, or down. The sensor 408 may also be able to determine a cardinal direction in which the user is facing, among other possibilities.

While one button or switch 404, one touch-sensitive surface 406, one movement sensor 408, and one microphone 410 is illustrated in FIG. 4, in some embodiments a subset of these devices may be provided. In at least one embodiment, a plurality of buttons or switches 404 and/or a plurality of touch-sensitive surfaces 406 may be disposed on one or more of the frame elements of the glasses 102. Additionally, the button or switch 404 and/or touch-sensitive surface 406 may be provided having a different shape or having different dimensions than that shown in FIG. 4. In one embodiment, a plurality of the movement sensors 408 mentioned above could be used alone, or in combination, to track movement and/or determine direction. Additionally, more than one microphone 410 may be provided.

The input interface may be wiredly or wirelessly coupled to the computing device 202 to allow a user to control settings and features of the wearable electronic device system 200, to initiate communications with other wearable electronic devices, to receive positioning and/or movement information from the movement sensor 408, to respond to requests received from other wearable electronic devices, and/or to control and interact with information displayed on the lenses 108, 110, among other possibilities.

2. Communication Between Wearable Electronic Device Systems

Figure 5:
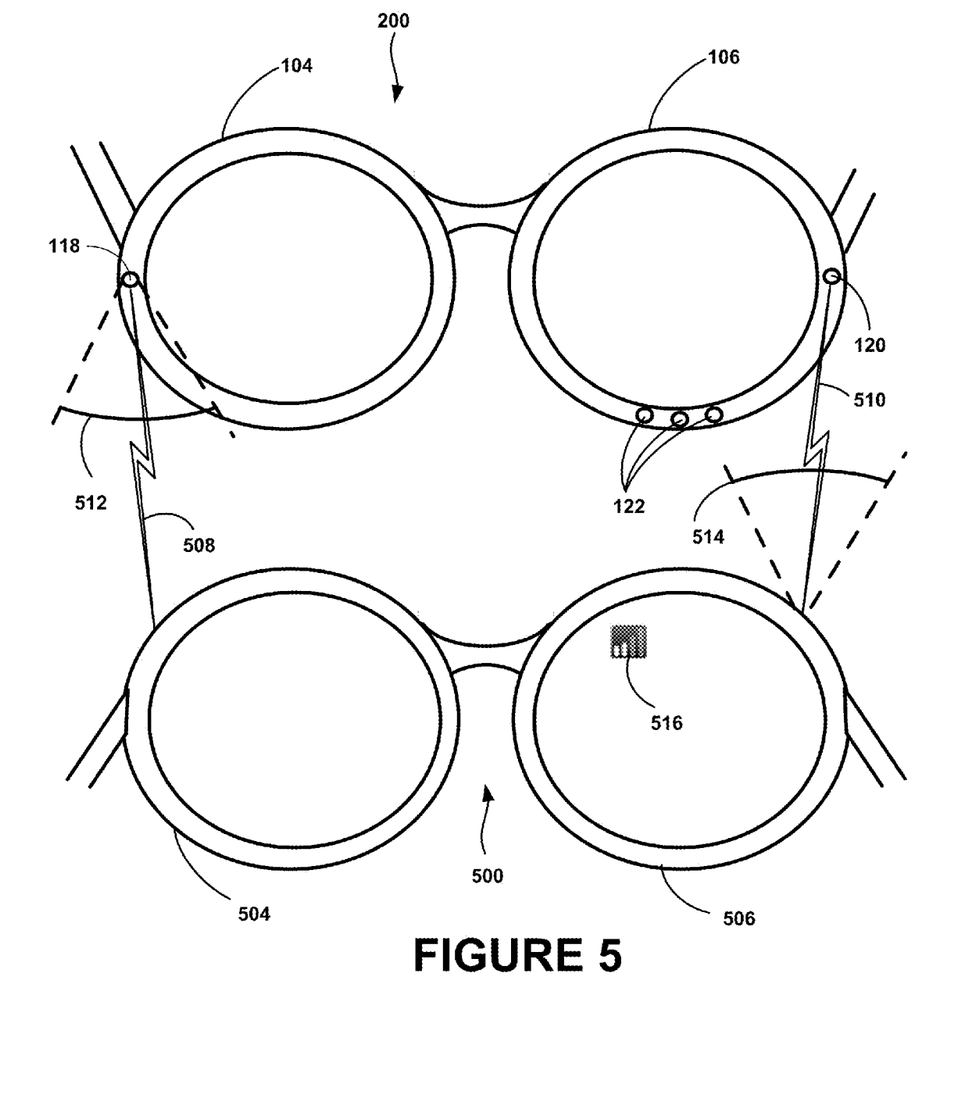
FIG. 5 illustrates an example of communication links established between first and second wearable electronic device structures.

FIG. 5 illustrates example wireless communication links between a first wearable electronic device system 200 worn by a first user (not shown) and a second wearable electronic device system 500 worn by a second user (not shown). Unless otherwise stated, system 500 includes the same and/or similar elements as those already discussed with respect to system 200, such as a left lens frame 504 and right lens frame 506. A first wireless communication link 508 is created between the first electromagnetic radiation transmission device 118 disposed on lens frame 104 and a second electromagnetic receiver device (not shown) disposed on lens frame 504. The first electromagnetic radiation transmission device 118 may be an IR transmitter and the first communication link 508 may be an IR communication link. As shown by the dashed cone-shaped lines in FIG. 5, the first communication link 508 is a directional communication link having a beam width 512 of, for example, 60°. In some embodiments, the beam width may be as wide as 180°, and in other embodiments as narrow as 1°, or somewhere in between. An advantage of using a directional communication link to make first contact with another wearable electronic device system is that the directionality of the communication link 508 can act as a selection mechanism in and of itself, preventing communications links from being created with devices outside of the beam width of communication link 508 (e.g., based on an inference that the first user does not wish to connect with them). Furthermore, by disposing the electromagnetic transmission device 118 on a wearable item that tracks a direction and movement of the first user's head (or body), the system 200 can advantageously take into account a current direction of the first user's field of view or body-direction as evidence of the first user's intent to connect with one or more wearable devices in the first user's field of view or body-direction.

An IR transmitter for use as the first electromagnetic radiation transmission device 118 may include an IR LED that emits a directed light in the IR range (e.g., having a wavelength between 0.7 and 300 μm), or a semiconductor laser that emits a directed light within the same range. Because the light emitted from an LED is less-directed than that emitted from a laser, additional structures could be implemented to limit a beam width of IR light emitted from the LED. For example, the LED could be placed within a cavity in the lens frame 104 such that the surrounding frame material limits the beam width of emitted IR light from the LED. Additionally or alternatively, a lens or other structure could be provided over or around the IR transmitter to focus the light emitted from the LED. Other techniques could also be used.

Of course, other electromagnetic wavelengths that are visible or invisible to the human eye could also be used. For example, radio-frequency (RF) waves (having a wavelength from approximately 3 m to $3 \times 10^4$ m) could be emitted and detected using directional antennas, such as a yagi antenna, a log-periodic antenna, a corner reflector antenna, a patch antenna, or a parabolic antenna. Alternatively, an LED or laser that emits a directed light at a visible color wavelength (e.g., red, blue, green, etc.) or other wavelength ranges could be used. Furthermore, and in addition to directed electromagnetic radiation, other types of directed wireless transmissions could be used. For example, directed acoustic energy in the human audible or inaudible range (e.g., 20 kHz-200 Mhz) could be used. A beam forming acoustic transducer array could be used to aim the acoustic beam in a particular direction. Other types of directed wireless transmissions could be used as well.

The communication link 508 may include modulated electromagnetic signals modulated in accordance with data to be transmitted to other users. Data may be transmitted across the communication link 508 via any one or more of phase, amplitude, frequency, intensity, or pulse-width modulation, among other possibilities. In the case of IR, the communication link 508 may be compliant, for example, with one or more Infrared Data Association (IrDA) specifications. An effective distance (range) of the communication link 508 may be set by controlling the power of the transmission device 118, applying more power to achieve greater link ranges, and less power to limit the link range. In one embodiment, the power of the transmission device 118 is controlled to limit the range of the link 508 to between 2-20 m. In some embodiments, the range may be limited to between 2-10 m. Computing device 202 may function to control transmission characteristics of communication link 508, such as modulation, power, etc.

In addition to communication link 508, a second communication link 510 may be established between a second electromagnetic transmitter device (not shown) disposed on lens frame 506, and the reception device 120 disposed on lens frame 106. Reception device 120 may be an IR receiver including a photodetector capable of detecting optical signals from second communication link 510 and converting the optical signals into electrical signals for further processing by computing device 202. For example, a silicon p-i-n photodiode may be used as the IR receiver. Other types of detectors could also be used, including CCD and CMOS imaging sensors, and in the case of RF waves, an antenna and receiver circuit. Once converted to an electrical signal by the reception device 120, the electrical signal may be provided to a demodulation circuit, such as may be embodied in computing device 202, for further processing.

Signal strength indicators 122 and 516 may be used by first and second users to ensure that quality communication links 508 and 510 are maintained between them. For example, the second user wearing the system 500 may be able to observe both signal strength indicator 516 (indicating the strength and/or quality of the communication link 508 between the transmission device 118 on lens frame 104 and the receiver device on lens frame 504), and signal strength indicator 122 (indicating the strength and/or quality of the second communication link 510 between the transmission device on lens frame 506 and the reception device 120 on lens frame 106). The first user wearing the system 200 may be able to obtain similar information on the quality of the communication links 508 and 510 via separate corresponding signal strength indicators. By observing respective signal strength indicators, the first and second users can each re-direct and/or adjust the position of their heads and/or bodies, thus re-directing and/or adjusting the systems 200 and 500, in order to maximize the quality of the communication links 508 and 510.

Figure 6:
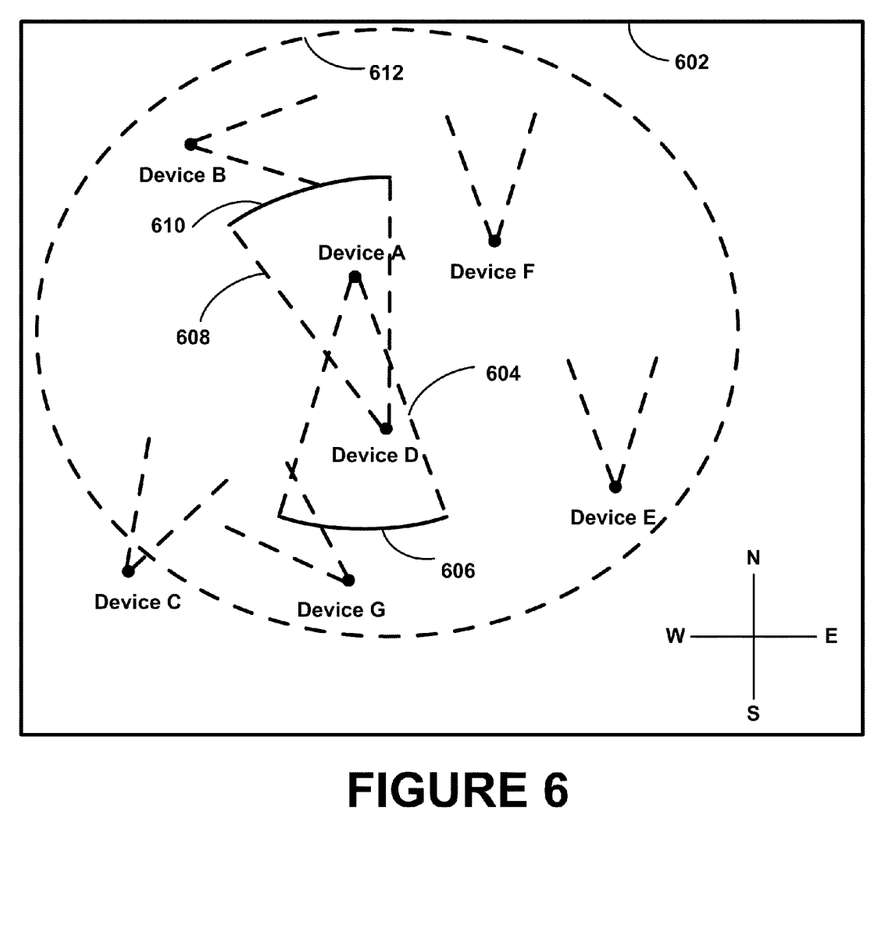
FIG. 6 is a diagrammatic example illustrating the difference between using a directional electromagnetic transmission to establish first contact and using an omni-directional electromagnetic transmission to establish first contact.

FIG. 6 is a diagrammatic example illustrating the difference between using a directional electromagnetic transmission as a selection mechanism to establish first contact with another device and using an omni-directional electromagnetic transmission to establish first contact. As shown in FIG. 6, each of Devices A-G in room 602 is a wearable electronic device system having a directed communication beam width delineated by respective dashed-line cones 604, 608 and having a communication beam range delineated by solid-line arcs 606, 610. Each of the Devices A-G may be associated with a respective User A-G. In this example, User A desires to communicate with User D, who is within Device A's communication range 604, 606. Given Device A's directed communication range 604, 606, User A could also seek out contact with User B and/or User F by turning his or her head or body in a direction towards Device B and/or Device F. Accordingly, the directed communication range 604, 606 acts as a selection mechanism in and of itself by allowing Device A to choose with whom to communicate by making a body motion to cause Device A's wearable electronic device system to point in Device D's direction. This selection process thus reduces the amount of input required at Device A to identify and select a communication target and reduces the chance of someone else intercepting communications between Device A and Device B, among other benefits.

Although Device A is illustrated as also being within Device D's communication range 608, 610 such an arrangement is not necessary if only uni-directional communication from Device A to Device D is required. For example, User A may wish to simply transmit data (such as contact information, a presentation, etc.) to User D without establishing a bi-directional link with User D. Security settings on the Device D wearable electronic device may be set to either allow or deny such a uni-directional link. In one embodiment, a whitelist or blacklist data structure may be used to allow or deny such links. In one embodiment, a security authorization code may be transmitted from Device A to Device D prior to, or along with, the data and used to validate or authorize the uni-directional communications. Other security mechanisms could be implemented as well.

Assuming that Device A and Device D are both within each other's communication range, as illustrated in FIG. 6, Device A may initiate contact with Device D either automatically (as the only device within communication range of Device A) or in response to User A's manipulation of an input interface of the Device A wearable electronic device system. Further exchanges of data between Device A and Device D may occur via the same communication link used to initiate contact, or a different communication link (including an omni-directional communication link).

FIG. 6 also illustrates an example omni-directional communication range 612 for a communication link such as Bluetooth that also may be available to Device A. If Device A were to attempt to initiate contact with Device D using the omni-directional communication link 612, and assuming every Device A-G is configured to respond to Bluetooth discovery requests, every one of Devices B-G, with the exception of Device C (that is outside the range of communication link 612), would show up in a resulting list of potential devices to communication with. As a result, User A would have to decipher what Bluetooth identifier belongs to User D's Device D out of the list of identifiers associated with all of the other detected Devices, operate an interface to locate the Device D identifier, and operate the interface again to connect (or pair) with Device D. Accordingly, by using a directed communication range 604, 606, the ease and speed of data exchange with others can be improved, and security of data transmissions improved, among other benefits.

Figure 7:
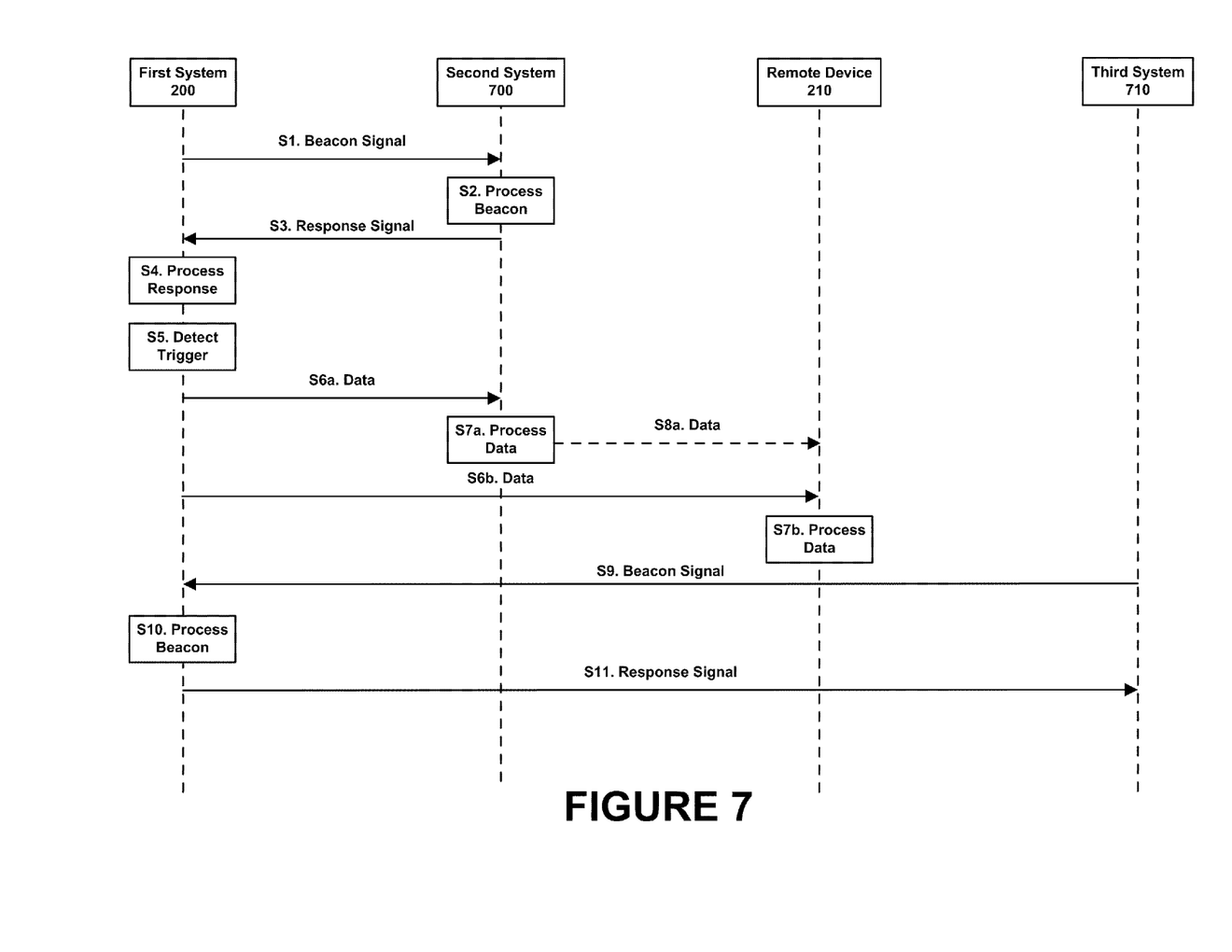
FIG. 7 illustrates an example message-flow diagram between first, second, and third wearable electronic device systems and a remote device.

FIG. 7 illustrates an example message-flow diagram between first, second, and third wearable electronic device systems and a remote device. More specifically, FIG. 7 illustrates an example message-flow diagram between a first wearable electronic device system 200 (e.g., associated with a first user such as User A in FIG. 6), a second wearable electronic device system 700 substantially similar to the first system 200 (e.g., associated with a second user such as User D in FIG. 6), a third wearable electronic device system 710 substantially similar to the first system 200, and a remote device 210. The remote device 210 may be another electronic device associated with the second system 700 (or the second user), may be a remote server device associated with the second system 700 (or the second user), or may be a remote server device having a data store or account associated with the second system 700 (or the second user).

At step S1 in FIG. 7, the first system 200 emits an intermittent beacon signal via a directed electromagnetic transmission towards the second system 700. The beacon signal may be broadcast automatically at a regular periodic interval, at random or semi-random intervals, in response to a software or hardware-generated event at computing device 202 of first system 200, or in response to the first user's manipulation of an input interface element 404, 406, 408, 410, among other possibilities. The beacon signal may be transmitted in a manner as set forth with respect to FIG. 5 above.

The beacon signal may include a first-user identifier identifying the first system 200 or a first user of the first system 200, and may be, for example, a user name or password associated with the first user or the first system 200, a hardware device ID associated with the first system 200, an e-mail address associated with the first user, or a user account identifier associated with the first user or the first system 200, among other possibilities.

Additionally, the beacon signal (or some subsequent signal from the first system 200) may describe additional communications capabilities of the first system 200 that the second system 700 may consider using in future communications with the first system 200. Additional information may also be transferred in step S1 to effect future communication via the additional communications methods. For example, the first system 200 may also transmit to the second system 700 a Bluetooth identifier associated with the first system 200 that the second system 700 may subsequently use to connect (or pair) with the first system 200.

At step S2, the second system 700 processes the beacon signal. In response to receiving the beacon signal, the second system 700 may prompt a second user for authorization to respond to the beacon signal, which may include displaying a portion of the first-user identifier received from the first system 200 to the second user (e.g., via a lens-display system similar to that disclosed with respect to FIG. 3). For example, the second system 700 may display a prompt on a lens of glasses constituting a portion of the second system 700. Additionally, the second user may respond positively or negatively to the request via a user interface constituting a portion of the second system 700 (similar to that constituting the first system 200 described with respect to FIG. 2). The response may be, for example, a nod of the head in a "yes" vertical direction detected by a motion sensor input of the second system 700, or a detected shake of the head in a "no" horizontal direction. Voice commands may also be utilized via a microphone input of the second system 700 to accept ("yes") or deny ("no") the connection request. A particular gesture on a touch-sensitive surface of the second system 700 may be used to indicate an acceptance (such as a forward swipe in a direction from the second system 700 towards the first system 200) or a denial (such as a reverse swipe in a direction from the first system 200 towards the second system 700). Other possibilities exist as well.

The second system 700 may also access a locally or remotely stored whitelist or blacklist, using the first-user identifier, to automatically determine whether to respond to the beacon signal. For example, if the first-user identifier (or an associated identifier based on the first-user identifier) is located in the whitelist, processing may proceed to step S3, otherwise the beacon signal may be discarded without responding. A blacklist would operate in a similar, but opposite, fashion.

In some embodiments, very little or no processing may occur at step S2. For example, the second system 700 may be configured to respond to all received beacon signals. Processing of the beacon signal in this case may be limited, if at all, to recovering address information with respect to the first system 200 so as to properly create and transmit a response signal to the proper first system 200 in step S3.

In an embodiment in which the first system 200 transmits additional communications capabilities in step S1, the second system 700 may make a determination in step S2 regarding future modes of communication with the first system 200. For example, if the first system 200 broadcasts the beacon signal via an IR emitter and indicates an additional ability to communicate via Bluetooth, the second system 700 may determine in step S2 the best method of communication going forward (e.g., based on higher bandwidth, lower power consumption, etc.), and may send all subsequent communications to the first system 200 via the determined best method.

At step S3, assuming that the second system 700 determines in step S2 to respond to the beacon signal, the second system 700 transmits a response signal. The response signal may be transmitted in the same manner (e.g., using the same protocol and/or medium) as was used by the first system 200 in transmitting the beacon signal in step S1, or may be transmitted in a different manner (such as one indicated as supported by the first system 200 in step S1).

The response signal in step S3 may include an identification of one of the second system 700 and the second user associated with the second system 700. For example, the identification may include a user name or password associated with the second user or the second system 700, a hardware device ID associated with the second system 700, an e-mail address associated with the second user or second system 700, or a user account identifier associated with the second user or second system 700, among other possibilities.

The response signal may also describe additional communications capabilities of the second system 700 that the first system 200 may consider using in future communications with the second system 700. Alternatively or additionally, the response signal may, in light of capability information regarding the first system 200 transmitted in step S1, instruct the first system 200 to use a determined best method of communication (e.g., based on higher bandwidth, lower power consumption, etc.) for future communications. For example, while the response signal in step S3 may be transmitted via IR, the response signal may instruct the first system 200, which indicated an ability to communicate via Bluetooth in step S1, to conduct all future communications with system 700 via Bluetooth. To this end, the second system 700 may also transmit to the first system 200 a Bluetooth identifier associated with the second system 700 that the first system 200 may use to connect (or pair) with the second system 700.

In one embodiment, the second system 700 may provide the first system 200 with an identity of a desired target for subsequent data communications (such as contact information, video, audio, etc.) in step S3. For example, the second system 700 may instruct the first system 200 to communicate future data communications directly back to the second system 700 via a same or different communication link, and/or may identify the remote device 210 (e.g., by providing additional associated identifiers) as a desired target that further data should be transmitted to. The second system 700 may identify the remote device 210 by any one or more identifiers, such as a hardware medium-access-control (MAC) address, an internet-protocol (IP) address, a Server Message Block (SMB) protocol address, or other identifier that can be used to uniquely identify the remote device 210.

In the event the second system 700 identifies the remote device 210 as a target device for future communications, the response signal (or a subsequent signal in step S3) may also include a remote device user identifier for use by the first system 200 in interacting with the remote device 210, such as a user name or password associated with the second user or the second system 700, an e-mail address associated with the second user or the second system 700, or a user account identifier associated with the second user or the second system 700, among other possibilities. The remote device user identifier may be the same or different than (and sent in place of or in addition to) the identification of the second system 700 or second user described above.

At step S4, the first system 200 processes the response signal transmitted in step S3. As part of the processing, the first system 200 may determine, based on the response signal, whether to transmit future communications to the second system 700 or the remote device 210. Additionally, the first system 200 may determine what communication protocol to use, based on the instruction or list of supported protocols set forth in the response signal. Also executed in step S4 may be a connection authorization process similar to that executed by the second system 700 and described with respect to step S2.

Steps S1 and S3 may also involve the negotiation of a security protocol to use for future data transmissions between the systems 200 and 700. For example, the first system 200 may transmit in step S1 supported wireless security protocols, and the second system 700 may transmit in step S3 its supported wireless security protocols (which may or may not be a subset of those transmitted in step S1). Alternatively, the second system 700 may select one of the security protocols transmitted in step S1, and inform the first system 200 of the selection in step S3. Of course, security protocol negotiations could also take place outside of the particular steps enumerated in FIG. 7. Possible wireless security protocols may include, but are not limited to, the Temporal Key Integrity Protocol (TKIP), the Extensible Authentication Protocol (EAP), the Lightweight Extensible Authentication Protocol (LEAP), the Protected Extensible Authentication Protocol (PEAP), WiFi Protected Access (WPA), and WLAN Authentication and Privacy Infrastructure (WAPI). The first system 200 may determine what security protocol to use for future data transmissions, for example, in step S4.

At step S5, the first system 200 detects a trigger. The trigger may be a generated or hardware-generated trigger, or may be a trigger caused by the first user's manipulation of the first system's user interface. For example, the first system 200 may be configured to automatically transmit data to the target device indicated by the second system 700 in step S3. In this case, the trigger may be a software-generated or hardware-generated trigger raised in response to receiving the response signal in step S3 and/or in response to the processing executed in step S4.

In some embodiments, the trigger may be generated by the first user's manipulation of an input interface element of the first system 200. As set forth in FIG. 4, the user interface may include one or more input elements, such as buttons or switches 404, touch-sensitive surface 406, motion sensor 408, and/or microphone 410. For example, the first user manipulating the button or switch 404 may generate a trigger that is detected in step S5.

In an embodiment, the first user speaking a voice command that is received by the microphone 410, and recognized by a speech recognition program executing on computing system 202, may generate the trigger in step S5. For example, the user may speak a command such as "send phone number" that generates a trigger and causes the system 200 to transmit the first user's phone number as data in a subsequent step. Other voice commands and actions could also be used.

In at least one embodiment, the trigger may be generated by the first user gesturing across the touch-sensitive surface 406. The gesture may include, for example, a forward swipe across the touch-sensitive surface 406 in a direction from the first system 200 to the second system 700 (or e.g., from Device A towards Device D in FIG. 6) to resemble a "flicking" of data from the first system 200 to the second system 700. The forward swipe may be linked with a particular set of data to transfer, such as contact information. Other types of gestures could be used on the touch-sensitive surface 406 to generate the trigger, and other types of data could be transferred in accordance with different gestures. For example, a two-fingered swipe across the surface 406 may transfer different data (such as personal contact information instead of work contact information) than a one-fingered swipe. A double-tap on the touch-sensitive surface 406 may, for example, transmit a most-recently captured photo, or a photo that has been previously identified as one to send in response to a detected double-tap input. A reverse swipe on the touch-sensitive surface 406 may, instead of sending contact information, transmit a request to the second system 700 to send the second user's contact information in a subsequent transmission. Other types of gestures are possible as well.

In at least some embodiments, the motion sensor 408 may cause the trigger to be generated in response to a tracked movement of the first user. For example, a tilt of the first user's head in a particular direction or motion pattern may cause the trigger to be generated, and may further be associated with particular data to transfer. Additionally, in the event multiple systems are within a communication range of the first system 200, the motion sensor 408 may allow the first user to motion in a direction towards only one of the multiple systems as a further selection mechanism (in addition to the directed range of the transmission device 118). For example, in the event two systems are detected within range of the first user, an identifier associated with one may be displayed in the left lens 108, and a separate identifier associated with the other in the right lens 110, and a detected tilt or nod of the first user's head (to the left or to the right) used to choose the desired system for subsequent communications. In addition to the foregoing, other types of input elements could also be used to generate the trigger.

The interaction with the first user required to generate the trigger may also be more complex than a single operation of the input interface. For example, the first system 200 may prompt the first user for a type of data to send to the second system 700, and in the event of multiple systems being within range of the first system 200, may prompt the first user to select one of a plurality of target users to transmit the data to. The prompting may be effected by, for example, a display of data types that may be communicated to the second system 700 and/or remote device 210 via the inside-surface of the lens 108, 110 in the manner illustrated above with respect to FIG. 3. For example, potential images to transfer may be displayed on the inside-surface of the lens 108, 110, and selected by the first user via the input interface. Alternatively or additionally, work or home contact information may be displayed and selected via the input interface. Of course, in an embodiment where the computing device 202 is embodied as a mobile phone or PDA in communication with glasses 102 via a communication link 206, the first user may use a separate interface provided by the computing device 202 to select what data to transfer.

Subsequent to receiving the response signal in step S3 and detecting the trigger in step S5 (and in one embodiment, responsive to both of these events), the first system 200 may transmit data to one or more of the second system 700 and the remote device 210 in steps S6 and S7. Steps S6 and S7 may differ dependent upon the target identified for future communications by the second system 700 in Step S3. In steps S6a and S7a, for example, data may be communicated from the first system 200 to the second system 700, and may then be processed by the second system 700. In alternative or additional steps S6b and S7b, data may be communicated from the first system 200 to the remote device 210, and may then be processed by the remote device 210. Data communications in step S6a may occur in accordance with the protocol determined or selected by the first system 200 in step S4, or the protocol determined or selected by the second system 700 in step S2.

Data communications in step S6b may occur in accordance with any of the above noted protocols via a separate negotiation process (not shown) between first system 200 and remote device 210, or between the first system 200 and an intervening access point, router, base station, or other device (not shown) enabling a connection between the first system 200 and the remote device 210. The data communications in step S6b may also include the remote device user identifier transferred in step S3 for use by the remote device 210 in determining a proper storage space or user account with which to associate the data communicated in step S6b, in determining where to forward the communicated data to reach the second user, and/or in determining how to notify the second user of the reception of the data from the first system 200.

In steps S7a and S7b, the respective second system 700 and remote device 210 process the received data communicated in respective steps S6a and S6b. Processing, in the case of the second system 700 at step S7a, may include storing the received data in local storage, or transmitting the data via a separate communication link to a remote server such as remote device 210 for storage (as illustrated in optional step S8a). The separate communication link between second system 700 and remote device 210 may be a link similar to the communication link 208 set forth in FIG. 2. Alternatively or additionally, the second system 700 may display the data (e.g., in the case of contact information, video, photos, etc.) on one or more of the lenses of glasses constituting a portion of the second system 700, automatically or in response to the second user's operation of the user interface also constituting a portion of the second system 700.

Processing, in the case of the remote device 210 at step S7b, may include storing the received data in a local storage area associated with the second user, or transmitting the data via a separate communication link to another server or service (such as an instant messaging server or service, e-mail server or service, social networking server or service, picture printing server or service, etc.) identified in the communicated data in step S6b. For example, the data transmitted in step S6b may include social-networking identifiers identifying the first user of the first system 200 and the second user of the second system 700, and may be forwarded to a social networking server or service to link the two users at the social-networking service. In another example, the data transmitted may include pictures associated with the first user of the first system 200 and information identifying a printing service and account associated with the second user of the second system 700 at the printing service, such data being forwarded to the printing service by the remote device 210 for printing and/or delivery to the second user. In another example, the transmitted data may be contact information related to the first user of the first system 200 and may include information identifying a web-based address-book service and an account on the web-based address-book service associated with the second user of the second system 700, such data being forwarded to the address-book service for entry into address-book information associated with the second user. Many other possibilities exist as well.

At step S9, first system 200 may receive a beacon signal from a third system 710 in the same or similar manner as that set forth above with respect to step S1. At step S10, the first system 200 may process the beacon signal in the same or similar manner as that set forth above with respect to step S2. At step S11, the first system 200 may transmit a response signal in the same or similar manner as that set forth above with respect to step S3. Additional interactions between the first system 200 and third system 710 may follow the same or similar process as that set forth above with respect to steps S4-S8.

Additionally, for example, and although not explicitly illustrated in FIG. 7, the second system 700 may at any time after processing the beacon signal in step S2, detect a trigger similar to the way in which the first system 200 detects a trigger in step S5, and responsive to receiving the beacon signal and the trigger, transmit data to the first system 200 in a manner similar to that set forth in step S6a above. The first system 200 could then process the data in a manner similar to that set forth in step S7a above. Of course, the second system 700 could additionally or alternatively transmit the data (and, in one embodiment, the first-user identifier transferred in step S1) to the remote device 210 in a manner similar to that set forth in step S6b above. Other combinations and re-arrangements of steps are possible as well.

3. Example Hardware for a Wearable Electronic Device System

Figure 8:
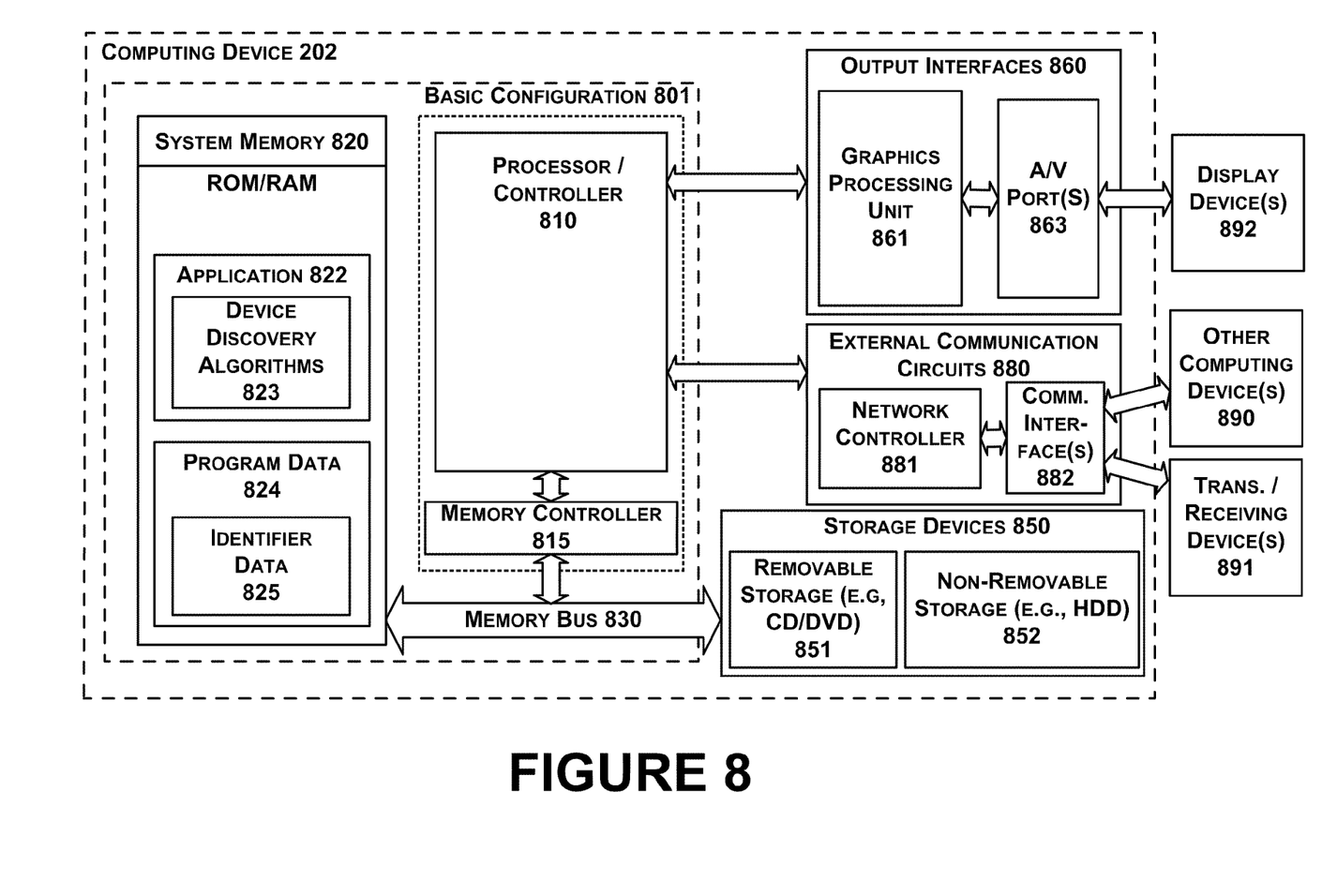
FIG. 8 is a functional block diagram of a computing device for supporting the wearable electronic device system of FIG. 2.

FIG. 8 is a functional block diagram of a computing device 202 for supporting the wearable electronic device systems set forth above (e.g., 200, 700, 710) arranged in accordance with at least some embodiments described herein. The computing device 202 may be a personal computer, mobile device, mobile phone, video game system, global positioning system, or other electronic system. In a basic configuration 801, computing device 202 may typically include one or more processors or controllers (processor) 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes one or more applications 822 and program data 824. Application 822 may include algorithms such as a device discovery algorithm 823 arranged to detect a beacon signal and process the beacon signal, in accordance with the present disclosure. Other process descriptions, steps, or blocks in flow or message diagrams in the present disclosure should be understood as potentially representing modules, segments, or portions of code which include one or more executable instructions stored in application memory 822 for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Program data 824 may include, among other things, identifier data 825 that identifies one or more of a user or a wearable electronic device system. In some example embodiments, applications stored in application memory 822 can be arranged to operate with program data 824. Computing device 202 can have additional features or functionality, and additional interfaces to facilitate communications between the basic configuration 801 and any devices and interfaces. For example, the data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

Computer storage media can include volatile and nonvolatile, removable and non-removable media implemented in any method or technology for storage of information, such as computer readable instructions, data structures, program modules, or other data.

System memory 820, removable storage media for use with removable storage devices 851, and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 202.

Computing device 202 can also include output interfaces 860 that may include a graphics processing unit 861, which can be configured to communicate to various external devices such as display devices 892 (which may include, for example, projecting devices 302, 306 and/or lenses 108, 110) or speakers via one or more A/V ports 863. External communication circuits 880 may include a network controller 881, which can be arranged to facilitate communications with one or more other computing devices 890 and/or one or more transmitting and/or receiving devices 891 (which may include, for example, the first electromagnetic radiation transmission device 118 and/or the first electromagnetic radiation reception device 120). The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, RF, IR, and other wireless media. The term computer readable media as used herein can include both storage media and communication media. The term tangible computer readable media may refer to just the storage media.

Computing device 202 can be implemented as a portion of a small-form factor portable (or mobile) electronic device such as a mobile phone, a multi-chip module (MCM), an application-specific integrated circuit (ASIC), a field-programmable gate array (FPGA), a PDA, a personal media player device, a wireless web-watch device, a personal headset device, an application specific device, or a hybrid device that include any of the above functions. Computing device 202 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 9:
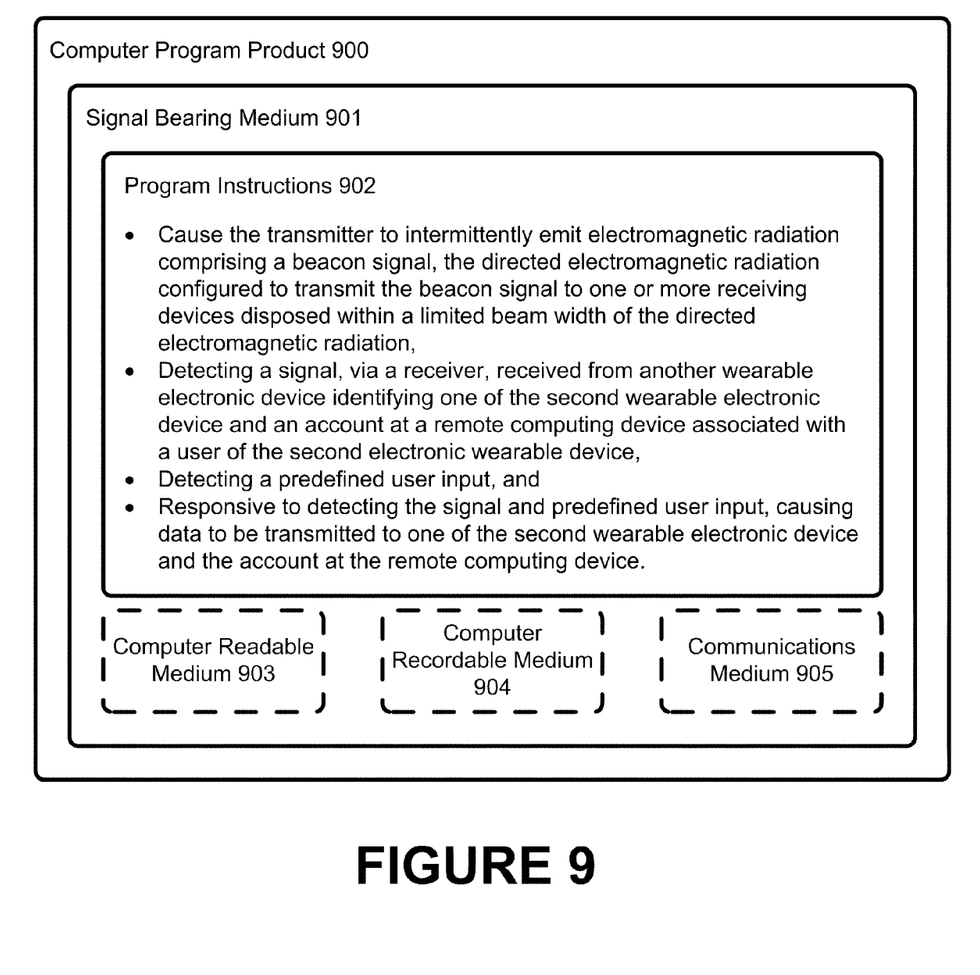
FIG. 9 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more programming instructions 902 that, when executed by one or more processors, may provide functionality or portions of the functionality described above with respect to FIGS. 1-7. Thus, for example, referring to the embodiment shown in FIG. 7, one or more features of steps S1, S2, S3, S4, S5, S6a, S6b, S7a, S8a, S9, S10, and S11 may be undertaken by one or more instructions associated with the signal bearing medium 901.

In some examples, the signal bearing medium 901 may encompass a tangible computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 202 of FIG. 8 may be configured to provide various operations, functions, or actions in response to the programming instructions 902 conveyed to the computing device 202 by one or more of the computer readable medium 903, the computer recordable medium 904, and/or the communications medium 905.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for exchanging information, the method comprising:
   intermittently emitting, via a transmitter coupled to a first wearable electronic device, directed electromagnetic radiation comprising a beacon signal, wherein the beacon signal comprises an indicator of at least one communication mode of the first wearable electronic device;
   receiving a beacon response from at least one additional wearable electronic device, wherein the beacon response comprises an indicator of at least one communication mode of the at least one additional wearable electronic device;
   selecting a second wearable electronic device with which to communicate by aiming the directed electromagnetic radiation at the second wearable electronic device so as to include the second wearable electronic device within a limited beam width of the directed electromagnetic radiation;
   receiving, via a receiver coupled to the first wearable electronic device, a signal from the second wearable electronic device identifying one of the second wearable electronic device and an account at a remote computing device associated with a user of the second wearable device;
   detecting, via an input interface coupled to the first wearable electronic device, a predefined input associated with an instruction to transmit additional data to one of the identified second wearable electronic device and the account at the remote computing device associated with the user; and
   responsive to receiving the signal and detecting the predefined input, transmitting the additional data from the first wearable electronic device to one of the second wearable electronic device and the account at the remote computing device associated with the user, wherein transmitting the additional data from the first wearable electronic device to the second wearable electronic device comprises selecting a communication mode from at least one communication mode of the first wearable electronic device and at least one communication mode of the second wearable electronic device.

2. The method of claim 1, wherein the directed electromagnetic radiation comprises a modulated infrared beam emitted from an infrared transmitter device, wherein the infrared device is one of a light emitting diode device and a laser device.

3. The method of claim 1, wherein the directed electromagnetic radiation comprises radio frequency waves emitted from a directed antenna.

4. The method of claim 3, wherein the directed antenna is one selected from a yagi antenna, a log-periodic antenna, a corner reflector antenna, a patch antenna, and a parabolic antenna.

5. The method of claim 1, wherein the input interface comprises one or more input elements selected from the group consisting of a touch-sensitive surface, a microphone, a movement sensor, a button, and a switch, and
   wherein detecting the predefined input comprises sensing a particular input pattern via one or more of the input elements.

6. The method of claim 5, wherein a content of the additional data transmitted varies dependent upon the particular input pattern detected via the one or more input elements.

7. The method of claim 6, wherein the content of the additional data is one of audio data, video data, image data, and contact information.

8. The method of claim 1, wherein the additional data is transmitted to the one of the second wearable electronic device and the account at the remote computing device associated with the user via a second omni-directional transmitter.

9. The method of claim 8, wherein the signal received from the second wearable electronic device includes information indicating omni-directional communications capabilities of the second wearable electronic device, and wherein the additional data is transmitted via the second omni-directional transmitter using a protocol selected in accordance with the indicated communications capabilities of the second wearable electronic device.

10. The method of claim 8, wherein the omni-directional transmitter is one selected from a Bluetooth transmitter, an IEEE 802.11 transmitter, a WiMAX transmitter, a ZigBee transmitter, and a cellular transmitter.

11. The method of claim 1, wherein the signal received from the second wearable electronic device includes information identifying the account at the remote computing device associated with the user;
  the method further comprising transmitting the additional data from the first wearable electronic device to the identified account at the remote computing device associated with the user.

12. The method of claim 1, further comprising displaying, at an inside part of the first wearable electronic device, a first indication of a signal strength associated with the signal received from the second wearable electronic device.

13. The method of claim 1, further comprising displaying, at an outside part of the first wearable electronic device, a second indication of the signal strength associated with the signal received from the second wearable electronic device.

14. The method of claim 1, wherein the additional data comprises information associated with a second user of the first wearable electronic device including at least one selected from an e-mail address associated with the second user, a phone number associated with the second user, a social-networking account identifier associated with the second user, and a mailing address associated with the second user.

15. The method of claim 1, wherein the additional data comprises first and second identifiers identifying a second user of the first wearable electronic device and the first user of the second wearable electronic device, and
  wherein the remote computing device is a social networking server having the account associated with the first user;
  the method further comprising transmitting the additional data from the first wearable electronic device to the social networking server so as to link respective accounts associated with the first and second identifiers.

16. A wearable electronic device comprising:
  a processor;
  an input interface;
  a transmitter coupled to the processor and configured to emit directed electromagnetic radiation; and
  a receiver;
  wherein the processor is configured to:
    select a second wearable electronic device with which to communicate with by causing the transmitter to intermittently emit directed electromagnetic radiation comprising a beacon signal, the directed electromagnetic radiation configured to transmit the beacon signal to one or more receiving devices disposed within a limited beam width of the directed electromagnetic radiation, wherein the beacon signal comprises an indicator of at least one communication mode of the first wearable electronic device;
    receive, via the receiver, a beacon response from the second wearable electronic device, wherein the beacon response comprises an indicator of at least one communication mode of the second wearable electronic device, and a signal from a second wearable electronic device identifying one of the second wearable electronic device and an account at a remote computing device associated with a user of the second wearable device;
    detect a predefined input via the input interface associated with an instruction to transmit additional data to one of the identified second wearable electronic device and the account at the remote computing device associated with the user; and
    responsive to receiving the signal and detecting the predefined input, cause the transmitter to transmit the additional data to one of the second wearable electronic device and the account at the remote computing device associated with the user, wherein cause the transmitter to transmit the additional data to one of the second wearable electronic device further comprises the selection of a communication mode from the at least one communication mode of the first wearable electronic device and the at least one communication mode of the second wearable electronic device.

17. The device of claim 16, wherein the transmitter is an infrared transmitter, and the directed electromagnetic radiation comprises a modulated infrared beam emitted from the infrared transmitter.

18. The device of claim 16, wherein the input interface comprises one of a touch-sensitive surface, a microphone, a movement sensor, a button, and a switch.

19. The device of claim 16, further comprising a first signal strength display disposed at an inside part of the wearable electronic device;
  wherein the processor is further configured to cause the first signal strength display to indicate a signal strength associated with the signal received from the second wearable electronic device.

20. The device of claim 16, further comprising a second signal strength display disposed at an outside part of the wearable electronic device;
  wherein the processor is further configured to cause the second signal strength display to indicate the signal strength associated with the signal received from the second wearable electronic device.

* * * * *